US012609635B2

(12) United States Patent
Dai et al.

(10) Patent No.: US 12,609,635 B2
(45) Date of Patent: Apr. 21, 2026

(54) CONTROL METHOD FOR HYBRID PARALLEL INTEGRATED POWER SUPPLY

(71) Applicant: Wenzhou University, Wenzhou (CN)

(72) Inventors: Yuxing Dai, Wenzhou (CN); Zhenxing Zhao, Wenzhou (CN); Zishun Peng, Wenzhou (CN); Wen Hu, Wenzhou (CN); Fangying Zhu, Wenzhou (CN); Chun Zhang, Wenzhou (CN)

(73) Assignee: Wenzhou University, Wenzhou (CN)

( * ) Notice: Subject to any disclaimer, the term of this patent is extended or adjusted under 35 U.S.C. 154(b) by 249 days.

(21) Appl. No.: 18/624,097

(22) Filed: Apr. 1, 2024

(65) Prior Publication Data

US 2025/0007422 A1    Jan. 2, 2025

(30) Foreign Application Priority Data

Jun. 30, 2023    (CN) .......................... 202310802922.3

(51) Int. Cl.
| | |
|---|---|
| *H02M 7/493* | (2007.01) |
| *H02M 1/00* | (2006.01) |
| *H02M 1/12* | (2006.01) |
| *H02M 7/49* | (2007.01) |
| *H02M 7/5387* | (2007.01) |

(52) U.S. Cl.
CPC ......... *H02M 7/493* (2013.01); *H02M 1/0054* (2021.05); *H02M 1/12* (2013.01); *H02M 7/49* (2013.01); *H02M 7/53871* (2013.01)

(58) Field of Classification Search
CPC .... H02M 7/49; H02M 7/493; H02M 7/53871; H02M 1/0054; H02M 1/12
USPC .............................................. 363/41
See application file for complete search history.

(56) References Cited

U.S. PATENT DOCUMENTS

| | | | | |
|---|---|---|---|---|
| 2012/0099353 A1* | 4/2012 | Azuma | ................... | H02M 7/49 |
| | | | | 363/71 |
| 2022/0278602 A1* | 9/2022 | Erickson | ............. | H02M 1/0043 |
| 2022/0321016 A1* | 10/2022 | Khaligh | ............ | H02M 3/33561 |
| 2023/0344367 A1* | 10/2023 | Zeng | ................. | H02M 7/53876 |

* cited by examiner

*Primary Examiner* — Yemane Mehari

(74) *Attorney, Agent, or Firm* — Bochner PLLC; Andrew D. Bochner

(57)    ABSTRACT

Disclosed is a control method for a hybrid parallel integrated power supply. Under the condition of a 2:1 current ratio between a Si-based inverter and a SiC-based inverter, an optimal power ratio between the two inverters is obtained by reducing a power loss of a fundamental wave component on the Si-based inverter. Based on the fitting for effective values of a harmonic current on the Si-based inverter, an optimal switching frequency of the Si-based inverter and a relationship between a minimum harmonic-current conduction loss and a switching loss under the optimal switching frequency are obtained. Zero sequence components of the current are eliminated through rapid switching of the SiC-based inverter, to suppress harmonic waves.

9 Claims, 4 Drawing Sheets

1

CONTROL METHOD FOR HYBRID PARALLEL INTEGRATED POWER SUPPLY

CROSS REFERENCE TO RELATED APPLICATION

This patent application claims the benefit and priority of Chinese Patent Application No. 202310802922.3, filed with the China National Intellectual Property Administration on Jun. 30, 2023, the disclosure of which is incorporated by reference herein in its entirety as part of the present application.

TECHNICAL FIELD

The present disclosure relates to the technical field of power supply control, and in particular, to a control method for a hybrid parallel integrated power supply.

BACKGROUND

As the core component for energy conversion and system control of shore power supply systems, inverters determine the stability, reliability, and efficient operation of the shore power supply systems. Therefore, the research on high-power, high-performance, and cost-effective integrated power supplies is urgent. Single-device inverter power supplies in the prior art have limitations, lacking redundancy and having poor scalability, making them less suitable for diverse existing power supply systems. Additionally, the prior art also offers inverter power supply topologies that utilize a combination of high-capacity Si-based inverters and low-capacity SiC-based inverters in parallel. The expandability and redundancy of such topologies have been widely discussed. However, a calculation method for power supply control thereof is insufficient to implement harmonic compensation control and optimize conduction losses.

Through research, Patent Publication No. CN107834561A, entitled "Harmonic Improvement Method For Inverter Of Power Generation System," discloses the following approach, converting a wind speed/solar energy into an output power of an inverter, and then classifying the output power into several power level ranges based on a curve of total harmonic distortion (THD) vs. output power, with each power level range corresponding to a switching frequency to keep the THD below 5%. During the whole-year operation of the wind/solar power generation system, a corresponding switching frequency is adopted according to the power level range where the output power resides, to adapt to the changing output power, thereby improving harmonics. However, this approach lacks redundancy advantages, has poor scalability and limited high harmonic suppression capability, and the provided power quality remains insufficient to meet high standards, making it unsuitable for complex and diverse power supply systems.

SUMMARY

In response to the scientific challenge of the immature power distribution scheme for a hybrid parallel integrated power supply, the present disclosure designs a control method for a hybrid parallel integrated power supply. Under the condition of a 2:1 current ratio between a Si-based inverter and a SiC-based inverter in a hybrid parallel integrated power supply, load current distribution is optimized to minimize power losses. The goal is to compromise impact of a switching frequency of the Si-based inverter on device losses and THD of the load current. The method also optimizes the pulse-width modulation (PWM) frequency selection. To achieve these objectives, the present disclosure provides the following technical solution: a control method for a hybrid parallel integrated power supply, including the following steps:

step S1: connecting a Si-based inverter and a SiC-based inverter in parallel on a direct current bus;

step S2: setting two proportional-integral controllers in a d-q coordinate system, for controlling the Si-based inverter and the SiC-based inverter respectively;

step S3: setting a proportional harmonic compensation controller in an abc coordinate system for the SiC-based inverter to calculate a minimum value of harmonic distortion in an output load current of the Si-based inverter;

step S4: by using a novel current distribution method, minimizing a conduction loss generated by fundamental currents in the Si-based inverter and the SiC-based inverter; and step S5: calculating an optimal frequency of a PWM wave according to a harmonic-induced conduction loss of the PWM wave at different frequencies and a switching loss of the Si-based inverter.

Optionally, the proportional-integral controller for controlling the Si-based inverter processes basic power within a range of 1-10 KHz.

Optionally, the proportional-integral controller for controlling the SiC-based inverter processes partial power above 10 KHz.

Optionally, the proportional harmonic compensation controller is used for calculating numerical values of the fundamental current and a fundamental operating frequency of the SiC-based inverter.

Optionally, the proportional-integral controller suppresses harmonics by controlling rapid switching of the SiC-based inverter, to eliminate zero sequence components caused by a circulating current.

Optionally, in step S4, a minimum value of the conduction loss $P_1$ is calculated using the following method:

$$P_1 = T_{si}V_{CEO} + |I_{si}|_{RMS}^2 r_{si} + (|I_o|_{RMS} - |I_{sic}|_{RMS})^2 R_{DS(ON)}$$

by calculating a global minimum value of $P_1$:

$$\frac{dP_1}{d|I_{si}|_{RMS}} = 0$$

$$\frac{d^2P_1}{d|I_{si}|_{RMS}} = r_{si} + R_{DS(ON)} > 0$$

a current value of the Si-based inverter under the minimum value of $P_1$ is obtained, where $V_{CEO}$ represents an on-state zero-current collector-emitter voltage of the Si-based inverter, $r_{si}$ represents an on-state collector-emitter resistance of the Si-based inverter, $R_{DS(ON)}$ represents an on-state drain-source resistance of the SiC-based inverter, $I_{si}$ represents an average current of the Si-based inverter, $|I_o|_{RMS}$ represents a total load current delivered by the hybrid parallel integrated power supply, $|I_{si}|_{RMS}$ represents a current value of the Si-based inverter in the hybrid parallel integrated power supply, and $|I_{SiC}|_{RMS}$ represents a current value of the SiC-based inverter in the hybrid parallel integrated power supply.

Optionally, in step S4, optimal current loads of the two inverters obtained through the novel current distribution method are as follows:

$$|I_{si}|_{RMS} = \frac{2I_{RMS}R_{DS(ON)} - \frac{k_1}{k_2}V_{CEO}}{2(r_{si} + R_{DS(ON)})}$$

$$I_{sic_{RMS}} = I_{load_{RMS}} - I_{si_{RMS}}$$

where k1 and k2 are:

$$k_1 = \left(\frac{1}{2\pi} + m_{si}\frac{\cos\varphi}{8}\right), k_2 = \sqrt{\frac{1}{8} + m_{si}\frac{\cos\varphi}{2\pi}}$$

$$0.457 < \frac{k_1}{k_2} < 0.583$$

where $m_{si}$ represents a modulation index, and cos φ represents a power factor of the Si-based inverter.

Optionally, in step S5, expression equations for the harmonic-induced conduction loss and the switching loss $P_2$ of the Si-based inverter are as follows:

$$P_2 = |I_{si\_harm}|_{RMS}^2 r_{si} + |I_{si\_harm}|_{RMS}^2 R_{DS(ON)} + \frac{f_{sw\_si}E_{max\_si}}{\pi}$$

$$|I_{si\_harm}|_{RMS} = THD \times I_{si\_fund\_rms}$$

where THD represents total harmonic distortion of the inverter under a given filter inductance value, and is expressed as follows:

$$THD = 0.00005 f^2_{sw\_si} - 0.0977 f_{sw\_si} + 63.118$$

A minimum value of the loss $P_2$ can be calculated, where $|I_{si\_harm}|_{RMS}$ represents a harmonic current generated by the Si-based inverter, $f_{sw\_si}$ represents a switching frequency of the Si-based inverter, $E_{max\_si}$ represents a maximum switching energy loss of the Si-based inverter, and $I_{si\_fund\_rms}$ represents the fundamental current of the Si-based inverter.

Optionally, the optimal frequency of the PWM wave satisfies:

$$\frac{dP_2}{f_{sw\_si}} = 0.$$

Compared with the prior art, beneficial effects of the present disclosure are as follows:

The present disclosure achieves the following beneficial effects: to overcome the limitations of inverter power supplies based on single devices, the present disclosure integrates the advantages of large capacity and low cost of silicon insulated-gate bipolar transistor (Si IGBT) inverter power supply devices with the advantages of low loss, high switching frequency, and high harmonic suppression capability of silicon carbide metal-oxide-semiconductor field-effect transistor (SiC MOSFET) inverter power supply devices. This not only enhances system redundancy and power quality but also has the advantages of easy scalability and low cost. Furthermore, the present disclosure comprehensively analyzes and calculates power losses for both fundamental and harmonic currents in the hybrid parallel integrated power supply, ensuring reasonable THD for the hybrid parallel integrated power supply. The load current distribution between the Si-based inverter and the SiC-based inverter and the switching frequency of the Si-based inverter are optimized, thereby minimizing the total power loss and the power supply loss.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

To better illustrate the technical solution of the present disclosure, a power control method for a hybrid parallel integrated power supply provided by the embodiments of the present disclosure are described in detail below with reference to FIG. 1 to FIG. 6.

Figure 1:
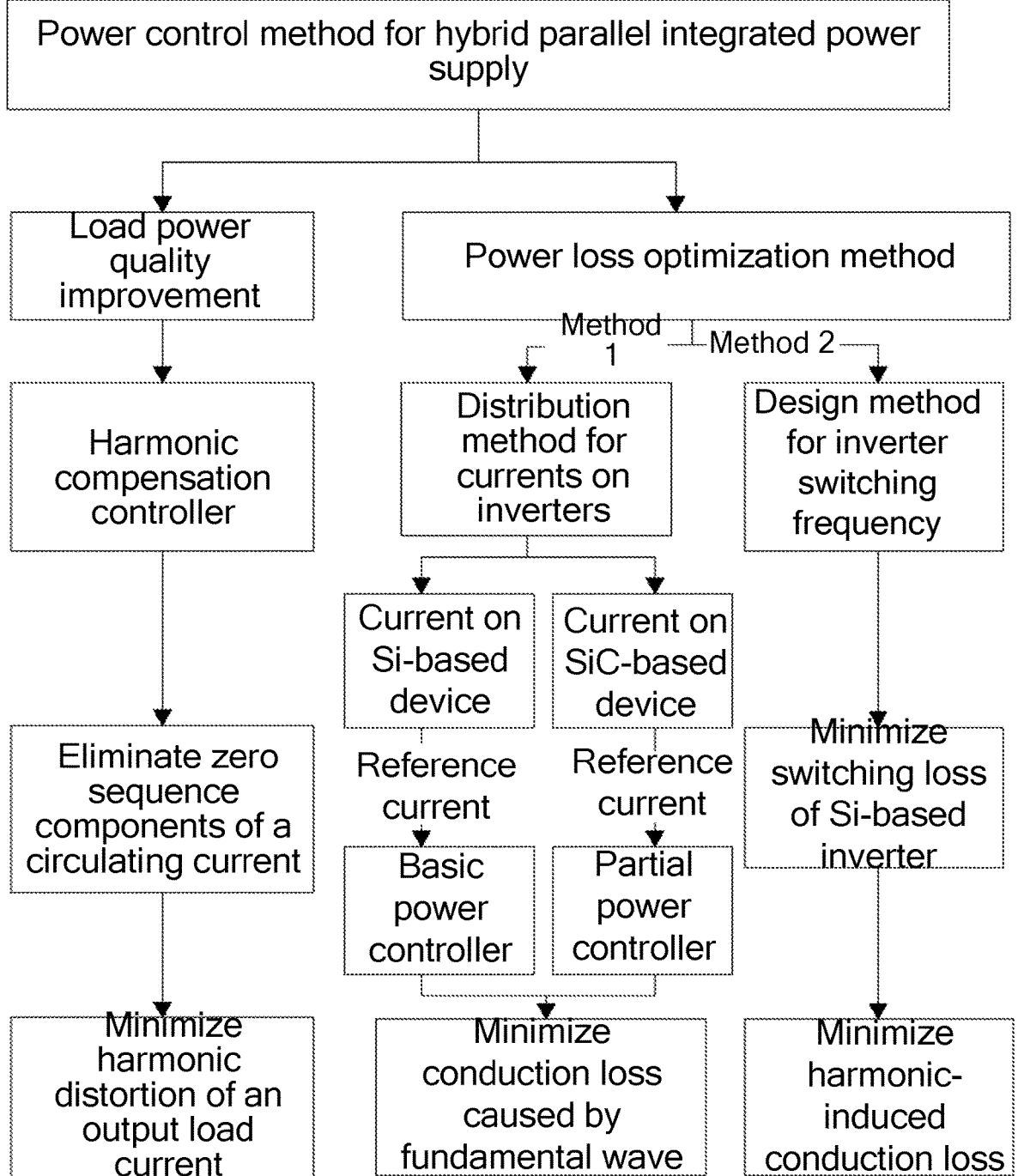
FIG. 1 is a schematic diagram of a specific control method according to the present disclosure.
Figure 2:
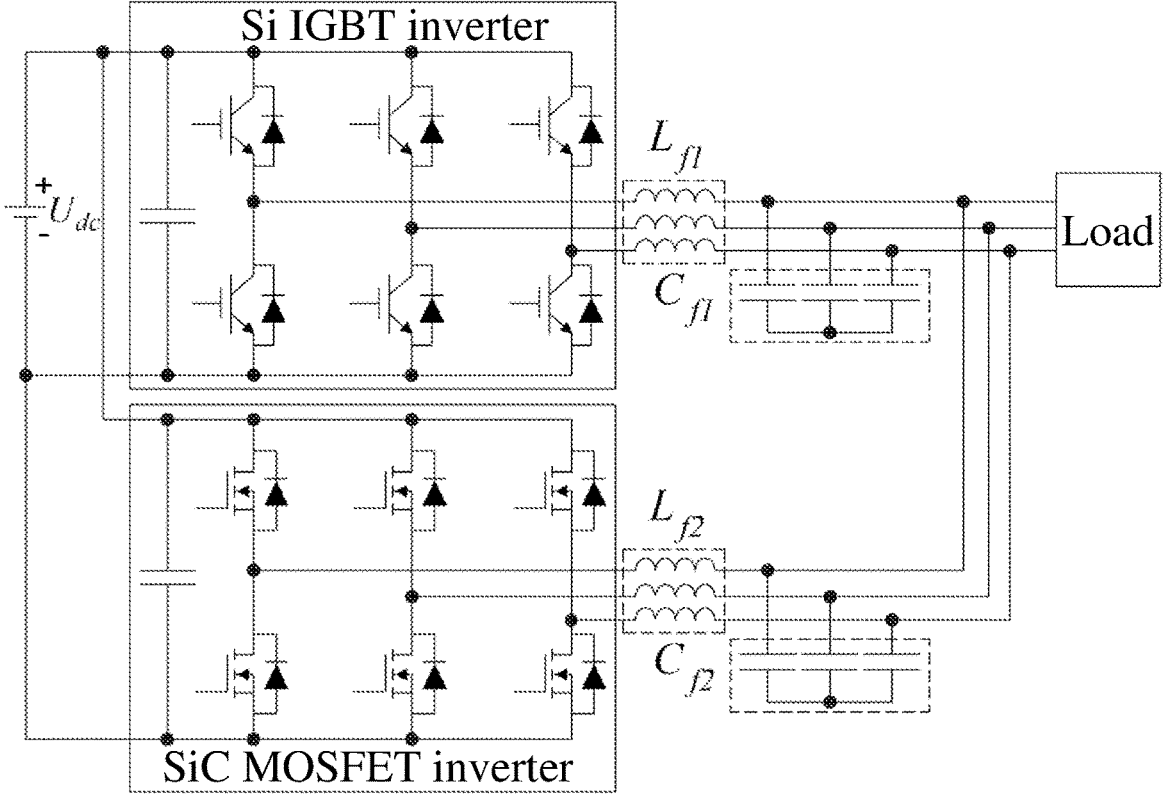
FIG. 2 is a block diagram of a proportional-integral controller for controlling a Si-based inverter according to the present disclosure.

FIG. 1 and FIG. 2 are schematic diagrams of a specific control method for a hybrid parallel integrated power supply according to the present disclosure. As the Si-based inverter and the SiC-based inverter share a common direct current bus when operating in parallel, a circulating current generated will result in zero sequence components in phase currents of the two inverters. Therefore, it is necessary to measure three-phase currents of the Si-based inverter and the SiC-based inverter separately.

Figure 3:
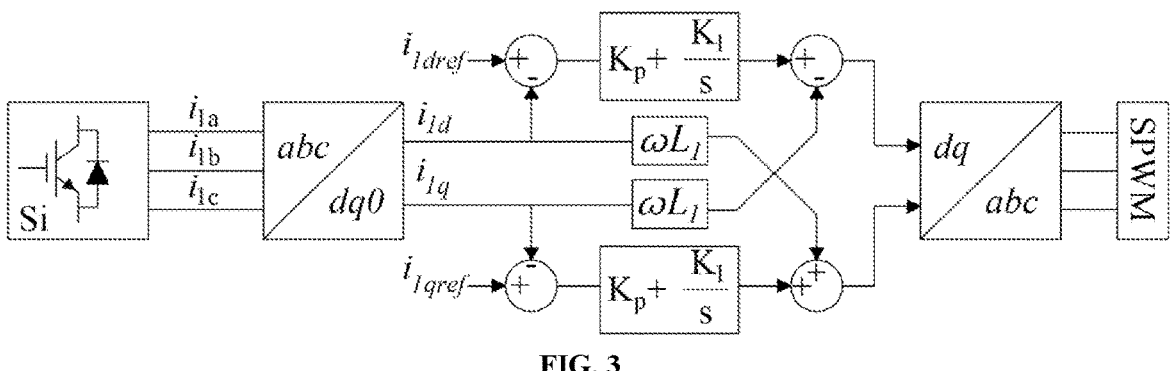
FIG. 3 is a block diagram of a proportional-integral controller for controlling a SiC-based inverter according to the present disclosure.

FIG. 3 shows a proportional-integral controller designed in a d-q coordinate system for processing the basic power of the Si-based inverter in the range of 1-10 kHz.

Figure 4:
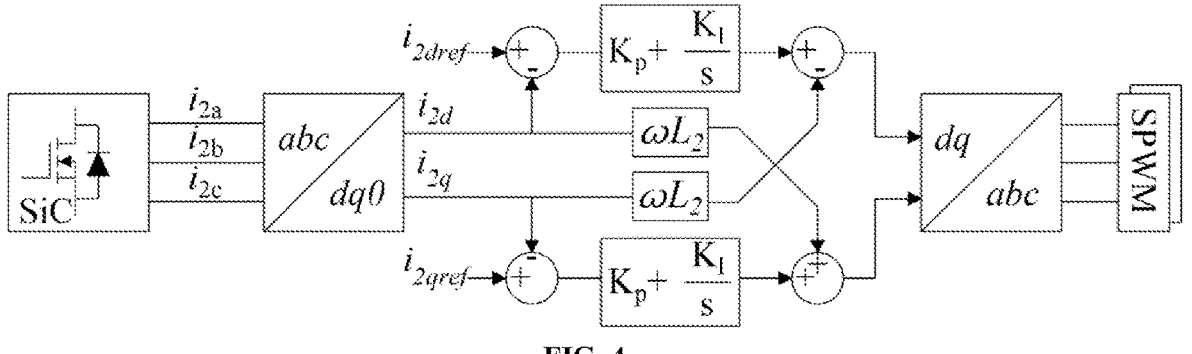
FIG. 4 is a topology diagram of an integrated power supply with a Si-based inverter and a SiC-based inverter in parallel according to the present disclosure.

FIG. 4 shows a proportional-integral controller designed in the d-q coordinate system for the SiC-based inverter, to handle the partial power of the SiC-based inverter above 10 kHz.

Figure 5:
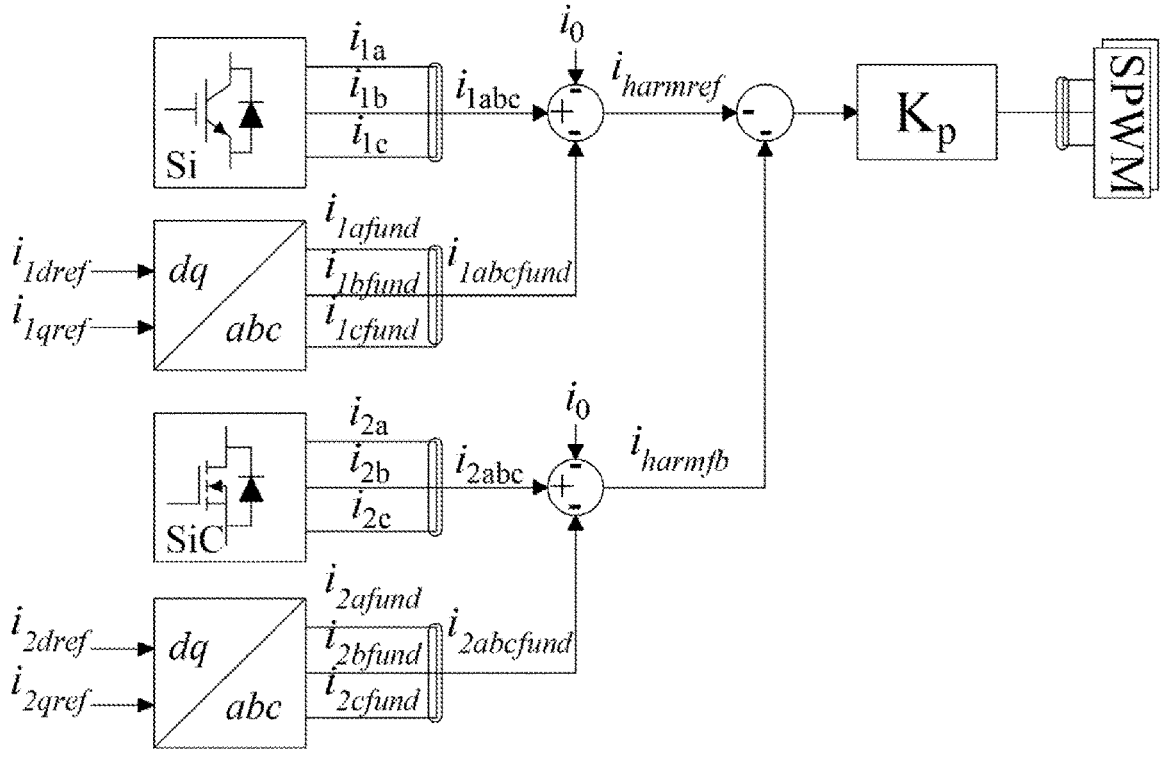
FIG. 5 is a block diagram of a harmonic compensation controller according to the present disclosure.

FIG. 5 is a block diagram of a harmonic compensation controller. To minimize harmonic distortion in an output load current of the low-frequency Si-based inverter, a proportional harmonic compensation controller is designed an abc coordinate system for the high-frequency SiC-based inverter, to conveniently calculate numerical values of the fundamental current and fundamental operating frequency. Harmonics can be suppressed by fast switching actions of the SiC-based inverter. The designed harmonic compensation controller eliminates zero sequence components caused by the circulating current.

Furthermore, by using a novel current distribution method, a conduction loss generated by the fundamental currents in the Si-based inverter and the SiC-based inverter changes depending on distributed currents on the Si-based inverter and the SiC-based inverter.

In a preferred manner, an expression for the conduction loss $P_1$ can be as follows:

$$P_1 = \overline{I}_{si} V_{CEO} + |I_{si}|^2_{RMS} r_{si} + (|I_o|_{RMS} - |I_{sic}|_{RMS})^2 R_{DS(ON)}$$

$$\overline{I}_{si} = I_{P_1}\left(\frac{1}{2\pi} + \frac{M\cos\varphi}{8}\right) = k_1 I_{P_1}$$

$$|I_{si}|_{RMS} = I_{P_1}\sqrt{\frac{1}{8} + \frac{M\cos\varphi}{8}} = k_2 I_{P_1}$$

A global minimum value of $P_1$ is obtained by solving the expression equation for the conduction loss $P_1$:

$$\frac{dP_1}{d|I_{si}|_{RMS}} = 0$$

$$\frac{d^2 P_1}{d|I_{si}|_{RMS}} = r_{si} + R_{DS(ON)} > 0$$

Optimal current loads for the two inverters obtained through the novel current distribution method are as follows:

$$|I_{si}|_{RMS} = \frac{2I_{RMS}R_{DS(ON)} - \frac{k_1}{k_2}V_{CEO}}{2(r_{si} + R_{DS(ON)})}$$

$$I_{sic_{RMS}} = I_{load_{RMS}} - I_{si_{RMS}}$$

k1 and k2 are:

$$k_1 = \left(\frac{1}{2\pi} + m_{si}\frac{\cos\varphi}{8}\right), k_2 = \sqrt{\frac{1}{8} + m_{si}\frac{\cos\varphi}{2\pi}}$$

$$0.457 < \frac{k_1}{k_2} < 0.583$$

A current value on the Si-based inverter is obtained, and an optimal current distribution ratio interval is determined. $V_{CEO}$ represents an on-state zero-current collector-emitter voltage of the Si-based inverter; $r_{si}$ represents an on-state collector-emitter resistance of the Si-based inverter; $R_{DS()}$ represents an on-state drain-source resistance of the SiC-based inverter; $\overline{I}_{si}$ represents an average current of the Si-based inverter; $|I_o|_{RMS}$ represents a total load current delivered by the hybrid parallel integrated power supply; $|I_{si}|_{RMS}$ represents a current value of the Si-based inverter in the hybrid parallel integrated power supply; $|I_{SiC}|_{RMS}$ represents a current value of the SiC-based inverter in the hybrid parallel integrated power supply; $m_{si}$ represents a modulation index, and $\cos\varphi$ represents a power factor of the Si-based inverter.

For a total load current of 30 A, it can be deduced from the above equations that the Si-based inverter should provide a load current of 22 A, while the SiC-based inverter should provide a load current of 8 A. For the selected devices, when power distribution proportions for the Si-based inverter and the SiC-based inverter in the hybrid parallel integrated power supply are 73.33% and 26.67% respectively, the overall conduction loss of the hybrid parallel integrated power supply is minimized.

The conduction loss generated by the harmonic currents on the Si-based inverter and the SiC-based inverter and the switching loss of the Si-based inverter vary according to the switching frequency of the Si-based inverter.

Expressions for the harmonic-induced conduction loss and the switching loss $P_2$ of the Si-based inverter are as follows:

$$P_2 = |I_{si\_harm}|_{RMS}^2 r_{si} + |I_{si\_harm}|_{RMS}^2 R_{DS(ON)} + \frac{f_{sw\_si}E_{max\_si}}{\pi}$$

$$|I_{si\_harm}|_{RMS} = THD \times I_{si\_fund\_rms}$$

An expression for the total harmonic distortion (THD) is as follows:

$$THD = 0.00005 f^2_{sw\_si} - 0.0977 f_{sw\_si} + 63.118$$

By calculating the minimum value of the loss $P_2$, an optimal PWM frequency is further selected:

$$\frac{dP_2}{f_{sw\_si}} = 0$$

$|I_{si\_harm}|_{RMS}$ represents a harmonic current generated by the Si-based inverter, and $f_{sw\_si}$ represents a switching frequency of the Si-based inverter; $E_{max\_si}$ represents a maximum switching energy loss of the Si-based inverter; $I_{si\_fund\_rms}$ represents the fundamental current of the Si-based inverter. THD represents total harmonic distortion of the inverter under a given filter inductance value. The expression of the THD is obtained from the formula for the function $P_2$, and through the third-order equation of $f_{sw\_si}$, the optimal switching frequency of the Si-based inverter is found to be 2 kHz under a basic load current of 22 A.

Figure 6:
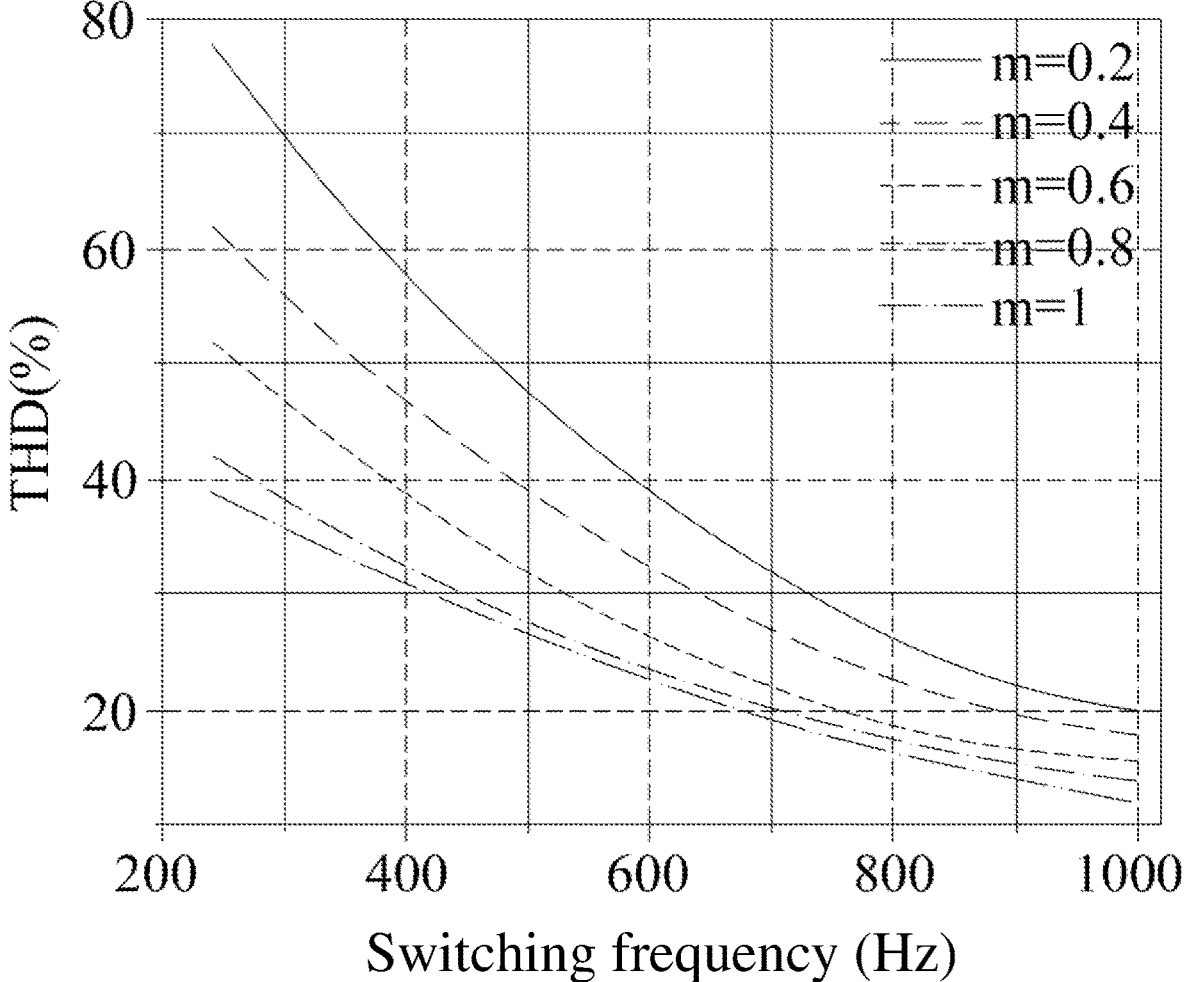
FIG. 6 is a diagram illustrating a functional relationship between a THD of an output current of a Si-based inverter and a PWM switching frequency according to the present disclosure.

The functional relationship between the THD of the output current of the Si-based inverter and the PWM switching frequency in FIG. 6 shows the inverse proportional relationship between total harmonic distortion THD and the PWM switching frequency more directly. The foregoing steps achieve harmonic compensation control for eliminating zero sequence components caused by the circulating current, optimize the conduction loss caused by the fundamental and harmonic currents, and the switching loss of the Si-based inverter, ultimately minimizing the loss of the hybrid parallel integrated power supply.

Apparently, for a person skilled in the art, the present disclosure is not limited to details of the above example embodiments, and the present disclosure may be implemented in other specific forms without departing from the spirit or basic features of the present disclosure. Therefore, the embodiments should be regarded as an example and non-limiting in every respect, and the scope of the present disclosure is defined by the appended claims rather than the above description. Therefore, all changes falling within the meaning and scope of equivalent elements of the claims should be included in the present disclosure, and any reference numbers in the claims should not be construed as a limitation to the related claims.

What is claimed is:

1. A control method for a hybrid parallel integrated power supply, comprising:

step S1: connecting a Si-based inverter and a SiC-based inverter in parallel on a direct current bus;

step S2: setting two proportional-integral controllers in a d-q coordinate system, for controlling the Si-based inverter and the SiC-based inverter respectively;

step S3: setting a proportional harmonic compensation controller in an abc coordinate system for the SiC-based inverter to calculate a minimum value of harmonic distortion in an output load current of the Si-based inverter;

step S4: by using a novel current distribution method, minimizing a conduction loss generated by fundamental currents in the Si-based inverter and the SiC-based inverter; and step S5: calculating an optimal frequency of a pulse-width modulation (PWM) wave according to a harmonic-induced conduction loss of the PWM wave at different frequencies and a switching loss of the Si-based inverter.

2. The control method for a hybrid parallel integrated power supply according to claim 1, wherein the proportional-integral controller for controlling the Si-based inverter processes basic power within a range of 1-10 KHz.

3. The control method for a hybrid parallel integrated power supply according to claim 1, wherein the proportional-integral controller for controlling the SiC-based inverter processes partial power above 10 KHz.

4. The control method for a hybrid parallel integrated power supply according to claim 1, wherein the proportional harmonic compensation controller is used for calculating numerical values of the fundamental current and a fundamental operating frequency of the SiC-based inverter.

5. The control method for a hybrid parallel integrated power supply according to claim 1, wherein the proportional-integral controller suppresses harmonics by controlling rapid switching of the SiC-based inverter, to eliminate zero sequence components caused by a circulating current.

6. The control method for a hybrid parallel integrated power supply according to claim 1, wherein in step S4, a minimum value of the conduction loss $P_1$ is calculated using the following method:

$$P_1 = \overline{I}_{si} V_{CEO} + |I_{si}|_{RMS}^2 r_{si} + (|I_o|_{RMS} - |I_{sic}|_{RMS})^2 R_{DS(ON)}$$

by calculating a global minimum value of $P_1$:

$$\frac{dP_1}{d|I_{si}|_{RMS}} = 0$$

$$\frac{d^2 P_1}{d|I_{si}|_{RMS}} = r_{si} + R_{DS(ON)} > 0$$

a current value of the Si-based inverter under the minimum value of $P_1$ is obtained, wherein $V_{CEO}$ represents an on-state zero-current collector-emitter voltage of the Si-based inverter, $r_{si}$ represents an on-state collector-emitter resistance of the Si-based inverter, $R_{DS()}$ represents an on-state drain-source resistance of the SiC-based inverter, $\overline{I}_{si}$ represents an average current of the Si-based inverter, $|I_o|_{RMS}$ represents a total load current delivered by the hybrid parallel integrated power supply, $|I_{si}|_{RMS}$ represents a current value of the Si-based inverter in the hybrid parallel integrated power supply, and $|I_{SiC}|_{RMS}$ represents a current value of the SiC-based inverter in the hybrid parallel integrated power supply.

7. The control method for a hybrid parallel integrated power supply according to claim 1, wherein in step S4, optimal current loads of the two inverters obtained through the novel current distribution method are as follows:

$$|I_{si}|_{RMS} = \frac{2 I_{RMS} R_{DS(ON)} - \frac{k_1}{k_2} V_{CEO}}{2(r_{si} + R_{DS(ON)})}$$

$$I_{sic_{RMS}} = I_{load_{RMS}} - I_{si_{RMS}}$$

wherein k1 and k2 are:

$$k_1 = \left(\frac{1}{2\pi} + m_{si}\frac{\cos\varphi}{8}\right), k_2 = \sqrt{\frac{1}{8} + m_{si}\frac{\cos\varphi}{2\pi}}$$

$$0.457 < \frac{k_1}{k_2} < 0.583$$

wherein $m_{si}$ represents a modulation index, and cos φ represents a power factor of the Si-based inverter.

8. The control method for a hybrid parallel integrated power supply according to claim 6, wherein in step S5, expression equations for the harmonic-induced conduction loss and the switching loss $P_2$ of the Si-based inverter are as follows:

$$P_2 = |I_{si\_harm}|_{RMS}^2 r_{si} + |I_{si\_harm}|_{RMS}^2 R_{DS(ON)} + \frac{f_{sw\_si} E_{max\_si}}{\pi}$$

$$|I_{si\_harm}|_{RMS} = THD \times I_{si\_fund\_rms}$$

wherein THD represents total harmonic distortion of the inverter under a given filter inductance value, and is expressed as follows:

$$THD = 0.00005 f^2_{sw\_si} - 0.0977 f_{sw\_si} + 63.118$$

wherein a minimum value of the loss $P_2$ is calculated; $|I_{si\_harm}|_{RMS}$ represents a harmonic current generated by the Si-based inverter, $f_{sw\_si}$ represents a switching frequency of the Si-based inverter, $E_{max\_si}$ represents a maximum switching energy loss of the Si-based inverter, and $I_{si\_fund\_ms}$ represents the fundamental current of the Si-based inverter.

9. The control method for a hybrid parallel integrated power supply according to claim 8, wherein the optimal frequency of the PWM wave satisfies:

$$\frac{dP_2}{f_{sw\_si}} = 0.$$

* * * * *